US012617121B2

(12) United States Patent
Thevenin et al.

(10) Patent No.: US 12,617,121 B2
(45) Date of Patent: May 5, 2026

(54) PART MADE FROM LIGNOCELLULOSIC MATERIAL AND METHOD FOR PRODUCING SUCH A PART

(71) Applicant: SAS WOODOO, Paris (FR)

(72) Inventors: Raphaële Thevenin, Paris (FR);
Timothée Boitouzet, Paris (FR)

(73) Assignee: SAS WOODOO, Paris (FR)

( * ) Notice: Subject to any disclaimer, the term of this patent is extended or adjusted under 35 U.S.C. 154(b) by 513 days.

(21) Appl. No.: 17/207,189

(22) Filed: Mar. 19, 2021

(65) Prior Publication Data

US 2021/0316471 A1 Oct. 14, 2021

Related U.S. Application Data

(63) Continuation of application No. PCT/FR2019/052177, filed on Sep. 18, 2019.

(30) Foreign Application Priority Data

Sep. 20, 2018 (FR) ...................................... 1858555

(51) Int. Cl.
B27K 3/15 (2006.01)
B29C 51/00 (2006.01)
B29K 33/00 (2006.01)

(52) U.S. Cl.
CPC ............ B27K 3/153 (2013.01); B29C 51/002 (2013.01); B29K 2033/12 (2013.01)

(58) Field of Classification Search
None
See application file for complete search history.

(56) References Cited

U.S. PATENT DOCUMENTS

| | | | |
|---|---|---|---|
| 3,607,355 A | 9/1971 | Loeb et al. | |
| 3,750,303 A | 8/1973 | Gates et al. | |
| 3,968,276 A | 7/1976 | Allen | |
| 4,025,663 A * | 5/1977 | Brandt | B44C 5/043 |
| | | | 427/393 |
| 4,178,861 A | 12/1979 | Vandernoek et al. | |
| 4,239,906 A | 12/1980 | Antrim et al. | |
| 4,348,256 A | 9/1982 | Bergstrom et al. | |

(Continued)

FOREIGN PATENT DOCUMENTS

| | | |
|---|---|---|
| CA | 1095663 A | 2/1981 |
| CA | 1186855 A | 5/1985 |

(Continued)

OTHER PUBLICATIONS

Berglund L. et al.; "Lignin-Retaining Transparent Wood", ChemSusChem, 2017, No. 10, pp. 3445-3451.

(Continued)

*Primary Examiner* — Chinessa T. Golden

(74) *Attorney, Agent, or Firm* — Wilson Sonsini Goodrich & Rosati

(57) ABSTRACT

A part made from lignocellulosic material (10) is formed from a single sheet (11) of partially delignified lignocellulosic material impregnated with an impregnation polymer. The part (10) comprises at least one curved portion having a double curvature surface. The part made from lignocellulosic material is produced by a production method implementing a thermoforming step. Use in particular for producing wood veneer structures.

20 Claims, 3 Drawing Sheets

(56) References Cited

U.S. PATENT DOCUMENTS

| | | | |
|---|---|---|---|
| 4,956,048 A | 9/1990 | Hise | |
| 4,992,308 A | 2/1991 | Sunol | |
| 5,041,192 A | 8/1991 | Sunol et al. | |
| 5,169,687 A | 12/1992 | Sunol | |
| 5,529,663 A * | 6/1996 | Springer | D21C 9/166 |
| | | | 162/76 |
| 5,804,035 A | 9/1998 | Michanickl et al. | |
| 6,242,245 B1 | 6/2001 | Amann et al. | |
| 6,649,245 B2 * | 11/2003 | Lenderink | B32B 21/08 |
| | | | 156/308.2 |
| 6,670,077 B1 | 12/2003 | Huang | |
| 6,770,168 B1 | 8/2004 | Stigsson | |
| 6,830,784 B2 | 12/2004 | Gutowski et al. | |
| 7,846,295 B1 * | 12/2010 | Medoff | A63B 59/50 |
| | | | 162/158 |
| 7,959,765 B2 | 6/2011 | Argyropoulos | |
| 8,546,109 B2 | 10/2013 | Varanasi et al. | |
| 8,575,374 B1 | 11/2013 | DeLong et al. | |
| 8,772,406 B2 | 7/2014 | Linhardt et al. | |
| 8,986,501 B2 | 3/2015 | Li et al. | |
| 9,343,733 B2 | 5/2016 | Lee et al. | |
| 10,030,157 B2 | 7/2018 | Humiston et al. | |
| 10,538,012 B2 | 1/2020 | Boitouzet et al. | |
| 11,254,026 B2 | 2/2022 | Boitouzet et al. | |
| 11,656,756 B2 | 5/2023 | Thevenin et al. | |
| 11,662,899 B2 | 5/2023 | Thevenin et al. | |
| 2002/0096274 A1 | 7/2002 | Lindstrom et al. | |
| 2002/0142145 A1 | 10/2002 | Lenderink | |
| 2002/0154100 A1 | 10/2002 | Hatakeda et al. | |
| 2003/0071389 A1 | 4/2003 | Manning et al. | |
| 2004/0090426 A1 | 5/2004 | Bourdelais et al. | |
| 2004/0187998 A1 | 9/2004 | Okuzawa et al. | |
| 2005/0110722 A1 | 5/2005 | Hayafuji | |
| 2005/0163935 A1 | 7/2005 | Magne et al. | |
| 2005/0233069 A1 | 10/2005 | Mikami et al. | |
| 2006/0093745 A1 | 5/2006 | Nicholson et al. | |
| 2006/0262258 A1 | 11/2006 | Wang et al. | |
| 2008/0020222 A1 * | 1/2008 | Hiraku | B27M 1/02 |
| | | | 428/541 |
| 2008/0160288 A1 | 7/2008 | Kingma et al. | |
| 2008/0223629 A1 | 9/2008 | Kashikawa et al. | |
| 2009/0176052 A1 | 7/2009 | Childs et al. | |
| 2009/0294186 A1 | 12/2009 | Fontanella et al. | |
| 2010/0081798 A1 | 4/2010 | Balensiefer et al. | |
| 2010/0119857 A1 | 5/2010 | Johnson et al. | |
| 2010/0156842 A1 | 6/2010 | Cherif | |
| 2011/0039470 A1 * | 2/2011 | Wakeman | B32B 5/022 |
| | | | 428/300.7 |
| 2011/0115723 A1 | 5/2011 | Wang et al. | |
| 2011/0190402 A1 * | 8/2011 | Linhardt | C08L 1/02 |
| | | | 106/163.01 |
| 2011/0220307 A1 | 9/2011 | Duggirala et al. | |
| 2011/0254778 A1 | 10/2011 | Wang et al. | |
| 2012/0105370 A1 | 5/2012 | Moore | |
| 2012/0135189 A1 * | 5/2012 | Olivieri | B63B 5/02 |
| | | | 428/140 |
| 2012/0146922 A1 | 6/2012 | Kang et al. | |
| 2012/0268693 A1 | 10/2012 | Takeda et al. | |
| 2012/0313867 A1 | 12/2012 | Luo et al. | |
| 2013/0063684 A1 | 3/2013 | Chen et al. | |
| 2013/0113726 A1 | 5/2013 | Tovar et al. | |
| 2013/0167603 A1 | 7/2013 | Bathurst et al. | |
| 2013/0326939 A1 | 12/2013 | Lawrence et al. | |
| 2014/0058077 A1 | 2/2014 | Laukkanen et al. | |
| 2014/0090577 A1 | 4/2014 | Sniady et al. | |
| 2014/0139560 A1 | 5/2014 | Jung et al. | |
| 2014/0186592 A1 | 7/2014 | Jeon et al. | |
| 2014/0269411 A1 | 9/2014 | Pelland et al. | |
| 2014/0275361 A1 | 9/2014 | Williamson et al. | |
| 2014/0311201 A1 | 10/2014 | Bathurst | |
| 2014/0311984 A1 | 10/2014 | Nakama et al. | |
| 2015/0035794 A1 | 2/2015 | Zhitomirskiy | |
| 2015/0090157 A1 | 4/2015 | Sniady et al. | |
| 2015/0210904 A1 | 7/2015 | Cothran et al. | |
| 2015/0274357 A1 | 10/2015 | Linares | |
| 2015/0301603 A1 | 10/2015 | Maggiali et al. | |
| 2016/0010279 A1 | 1/2016 | Hu et al. | |
| 2016/0041646 A1 | 2/2016 | Cho et al. | |
| 2016/0187544 A1 | 6/2016 | Watanabe et al. | |
| 2016/0209551 A1 | 7/2016 | Bekku et al. | |
| 2016/0257814 A1 | 9/2016 | Schade et al. | |
| 2016/0297970 A1 | 10/2016 | Garoff et al. | |
| 2017/0107641 A1 | 4/2017 | Busardo et al. | |
| 2017/0146730 A1 | 5/2017 | O'Keeffe | |
| 2017/0232782 A1 | 8/2017 | Thies et al. | |
| 2018/0059845 A1 | 3/2018 | Tada et al. | |
| 2018/0157111 A1 | 6/2018 | Ueki et al. | |
| 2018/0162891 A1 | 6/2018 | Miettinen | |
| 2018/0188870 A1 | 7/2018 | Boggs et al. | |
| 2018/0201765 A1 | 7/2018 | Sun et al. | |
| 2018/0208804 A1 | 7/2018 | Mieda et al. | |
| 2018/0217690 A1 | 8/2018 | Bauer | |
| 2018/0260602 A1 | 9/2018 | He et al. | |
| 2018/0284947 A1 | 10/2018 | Khajeh et al. | |
| 2018/0318773 A1 | 11/2018 | Childs et al. | |
| 2018/0327612 A1 | 11/2018 | Humiston et al. | |
| 2018/0329584 A1 | 11/2018 | Williams et al. | |
| 2018/0329586 A1 | 11/2018 | Sundstrom et al. | |
| 2018/0342702 A1 | 11/2018 | Hu et al. | |
| 2018/0345530 A1 | 12/2018 | Schrul et al. | |
| 2018/0370071 A1 | 12/2018 | Boitouzet et al. | |
| 2019/0012032 A1 | 1/2019 | Brandao Salgado et al. | |
| 2019/0018512 A1 | 1/2019 | Kim et al. | |
| 2019/0077040 A1 | 3/2019 | Boitouzet et al. | |
| 2019/0113791 A1 | 4/2019 | Yamamoto et al. | |
| 2019/0121474 A1 | 4/2019 | Lee et al. | |
| 2019/0121481 A1 | 4/2019 | Schoenauer et al. | |
| 2019/0129543 A1 | 5/2019 | Watanabe | |
| 2019/0131572 A1 | 5/2019 | Gwon et al. | |
| 2020/0164542 A1 | 5/2020 | Boitouzet | |
| 2020/0223091 A1 | 7/2020 | Hu et al. | |
| 2020/0238565 A1 | 7/2020 | Hu et al. | |
| 2020/0363721 A1 | 11/2020 | Aritoshi et al. | |
| 2021/0019033 A1 | 1/2021 | Thevenin et al. | |
| 2021/0122902 A1 | 4/2021 | Hu et al. | |
| 2021/0240588 A1 | 8/2021 | Balthazar De Lima Mussauer et al. | |
| 2022/0134596 A1 | 5/2022 | Boitouzet et al. | |
| 2023/0140418 A1 | 5/2023 | Patour et al. | |
| 2023/0418460 A1 | 12/2023 | Thevenin et al. | |
| 2024/0157597 A1 | 5/2024 | Boitouzet | |

FOREIGN PATENT DOCUMENTS

| | | | |
|---|---|---|---|
| CN | 1429695 A | 7/2003 | |
| CN | 1813900 A | 8/2006 | |
| CN | 1872508 A | 12/2006 | |
| CN | 1911612 A | 2/2007 | |
| CN | 1985891 A | 6/2007 | |
| CN | 101279458 A | 10/2008 | |
| CN | 101476252 A | 7/2009 | |
| CN | 101649125 A | 2/2010 | |
| CN | 102152356 A | 8/2011 | |
| CN | 102660885 A | 9/2012 | |
| CN | 102704297 A | 10/2012 | |
| CN | 102785274 A | 11/2012 | |
| CN | 102864672 A | 1/2013 | |
| CN | 202882247 U | 4/2013 | |
| CN | 103370469 A | 10/2013 | |
| CN | 103993042 A | 8/2014 | |
| CN | 104275723 A | 1/2015 | |
| CN | 104389216 A | 3/2015 | |
| CN | 104448585 A | 3/2015 | |
| CN | 104651964 A | 5/2015 | |
| CN | 106243391 A | 12/2016 | |
| DE | 19714302 A1 | 10/1998 | |
| EP | 0328533 A1 | 8/1989 | |
| EP | 1312453 A2 | 5/2003 | |
| EP | 2295215 A1 | 3/2011 | |
| EP | 2366949 A1 | 9/2011 | |
| EP | 2669382 A1 | 12/2013 | |
| EP | 3047656 A1 | 7/2016 | |
| EP | 2850109 B1 | 8/2017 | |

(56) References Cited

FOREIGN PATENT DOCUMENTS

| EP | 2935604 B1 | 11/2018 |
| EP | 3656520 A1 | 5/2020 |
| FR | 858764 A | 12/1940 |
| FR | 2507639 A1 | 12/1982 |
| FR | 2672296 A1 | 8/1992 |
| JP | S60229704 A | 11/1985 |
| JP | S60242003 A | 12/1985 |
| JP | S6162574 A | 3/1986 |
| JP | S61102211 A | 5/1986 |
| JP | S6297803 A | 5/1987 |
| JP | H02160986 A | 6/1990 |
| JP | H04336202 A | 11/1992 |
| JP | H04357023 A | 12/1992 |
| JP | H05138615 A | 6/1993 |
| JP | 2000514015 A | 10/2000 |
| JP | 2009073406 A | 4/2009 |
| JP | 2009531229 A | 9/2009 |
| JP | 2010042604 A | 2/2010 |
| JP | 2010163497 A | 7/2010 |
| JP | 2011225847 A | 11/2011 |
| JP | 2012009233 A | 1/2012 |
| JP | 2012510082 A | 4/2012 |
| JP | 2012093667 A | 5/2012 |
| JP | 2015020307 A | 2/2015 |
| JP | 2015077740 A | 4/2015 |
| JP | 2017504235 A | 2/2017 |
| JP | 2017207906 A | 11/2017 |
| JP | 6244808 B2 | 12/2017 |
| KR | 100977721 B1 | 8/2010 |
| RU | 2309039 C2 | 10/2007 |
| RU | 2007144304 A | 6/2009 |
| SU | 1657225 A1 | 6/1991 |
| WO | WO-8901856 A1 | 3/1989 |
| WO | WO-9002612 A1 | 3/1990 |
| WO | WO-9002836 A1 | 3/1990 |
| WO | WO-03099533 A1 | 12/2003 |
| WO | WO-2010089604 A1 | 8/2010 |
| WO | WO-2011112703 A2 | 9/2011 |
| WO | WO-2012080702 A2 | 6/2012 |
| WO | WO-2013005104 A2 | 1/2013 |
| WO | WO-2013066196 A1 | 5/2013 |
| WO | WO-2013144420 A1 | 10/2013 |
| WO | WO-2013181481 A1 | 12/2013 |
| WO | WO-2014002674 A1 | 1/2014 |
| WO | WO-2014113884 A1 | 7/2014 |
| WO | WO-2015084520 A1 | 6/2015 |
| WO | WO-2016138901 A1 | 9/2016 |
| WO | WO-2017029120 A1 | 2/2017 |
| WO | WO-2017098149 A1 | 6/2017 |
| WO | WO-2017136714 A1 | 8/2017 |
| WO | WO-2018013501 A1 | 1/2018 |
| WO | WO-2018068583 A1 | 4/2018 |
| WO | WO-2017098149 A9 | 5/2018 |
| WO | WO-2018120560 A1 | 7/2018 |
| WO | WO-2018130776 A1 | 7/2018 |
| WO | WO-2018182497 A1 | 10/2018 |
| WO | WO-2018191181 A1 | 10/2018 |
| WO | WO-2018211945 A1 | 11/2018 |
| WO | WO-2018224598 A1 | 12/2018 |
| WO | WO-2019055680 A1 | 3/2019 |
| WO | WO-2019155159 A1 | 8/2019 |
| WO | WO-2020058629 A1 | 3/2020 |
| WO | WO-2022008831 A1 | 1/2022 |
| WO | WO-2022185001 A1 | 9/2022 |

OTHER PUBLICATIONS

Berglund L. et al.; "Optically Transparent Wood from a Nanoporous Cellulosic Template: Combining Functional and Structural Performance", Biomacromolecules, 2016, No. 17, pp. 1358-1364.

Berglund L. et al.; "Transparent Wood for Functional and Structural Applications", Royal Society Publishing, Downloaded on Dec. 27, 2017, pp. 1-15.

Birkel, J. The surface impregnation of wood: II. use characteristics of impregnated wood: III. investigations of resin adhesives. (1946). Electronic Theses and Dissertations. Paper 1872.

Chen, H. Lignocellulosic Material. From: Handbook of Thermoset Plastics (Third Edition), 2014.

Fink, S; Transparent Wood a New Approach in the Functional Study of Wood Structure1 Holzforschung, vol. 46, 1992, No. 5.

Ganeshram, et al. Synthesis and characterization of phenol formaldehyde resin as a binder used for coated abrasives. Indian Journal of Science and Technologie, vol. 6 (6S), Jun. 2013, p. 4816.

Grinins, et al. Investigation of Birch Wood Impregnation with Phenol-Formaldehyde (PF) Resins. Sep. 2018;Conference: 9th European Conference on Wood Modification, At Arnhem, The Netherlands.

Hu, L. et al; Highly Anisotripic, Highly Transparent Wood Compositee. Adv Mater. Jul. 2016;28(26):5181-7. doi: 10.1002/adma. 201600427. Epub May 4, 2016.

Hu, L. et al; "Novel Nanostructured Paper with Ultrahigh Transparency and Ultrahigh Haze for Solar Cells", Nano Letters, 2014, 14, pp. 765-773.

Hu, L. et al; "Wood Composite as an Energy Efficient Building Material: Guided. Sunlight Transmittance and Effective Thermal Insulation", 2016, Adv. Energy Mater., 6, 1601122, pp. 1-7.

Li, et al. Lignin-Retaining Transparent Wood. ChemSusChem. Sep. 11, 2017; 10(17): 3445-3451.

Liew, et al. Direct Cellulase Gene Amplification From Hot Spring Using the Guidance of 16S rRNA Amplicon Metagenomics. In Metagenomics, 2018.

Luce, Foster. Delignified Impregnated Wood. Research Engineer, Westcraft, Inc., Los Angeles, California. Oct. 1944: 654-657.

Mi, et al. Scalable aesthetic transparent wood for energy efficient buildings. Nature communications 11.1 (2020): 1-9.

Nogi, M. et al; "Optically Transparent Nanofiber Paper", Advanced Material, 2009, 21, pp. 1595-1598.

Norman et al; "A new method for the determination of cellulose, based upon observations on the removal of lignin and other encrusting materials", Biochem J. 1933; 27(3): 818-831.

NPTEL. Preparation of wood pulp by sulfate (kraft) process. Accessed online Feb. 15, 2013 at https://nptel.ac.in/courses/103103029/pdf/rnod4.pdf.

PCT/EP2018/065047 International Search Report with Written Opinion dated Aug. 21, 2018.

PCT/FR2016/053247 International Search Report with Written Opinion dated Mar. 7, 2017.

PCT/FR2019/050262 International Search Report with Written Opinion dated May 23, 2019.

PCT/FR2019/052177 International Search Report with Written Opinion dated Jan. 16, 2020.

Ritter, George J.; "Distribution of Lignin in Wood" Microscopical Study of Changes in Wood Structure Upon Subjection to Standard Methods of Isolating Cellulose and Lignin, Industrial and Engineering Chemistry, Nov. 1925, vol. 17, No. 11, pp. 1194-1197.

Song, et al. Processing bulk natural wood into a high-performance structural material. Nature. Feb. 8, 2018; vol. 554, pp. 224+.

Swedish Standards Institute. SS-EN 13183-1. Moisture content of a piece of sawn timber—Part 1: Determination by oven dry method. Apr. 11, 2003 (This document contains the official English version of the European Standard EN 13183-1:2002).

Tanaka, et al. Solute diffusion into cell walls in solution-impregnated wood under conditioning process I: effect of relative humidity on solute diffusivity. J Wood Sci. (61):543-551 (2015). https://doi.org/10.1007/s10086-015-1503-x.

ToolBox—Refractive Index for some common Liquids, Solids and GasesSome common fluids and their refractive index Available at https://www.engineeringtoolbox.com/refractive-index-d_1264. html. Accessed on Apr. 2021.

Torres, D. Why knock on wood when touch will do? MSP Low-Power Plays—Blogs—TI E2E Community. May 25, 2017. Availabe at https://e2e.ti.com/blogs_/b/process/archive/2017/05/25/why-knock-on-wood-when-touch-will-do. Retrieved Oct. 1, 2020.

U.S. Appl. No. 15/781,978 Office Action dated Jul. 6, 2020.

U.S. Appl. No. 15/781,978 Office Action dated May 14, 2021.

U.S. Appl. No. 15/781,978 Office Action dated Nov. 16, 2020.

(56) References Cited

OTHER PUBLICATIONS

U.S. Appl. No. 16/185,342 Notice of Allowance dated Sep. 4, 2019.
U.S. Appl. No. 16/185,342 Office Action dated Mar. 22, 2019.
U.S. Appl. No. 16/700,123 Office Action dated Apr. 23, 2021.
U.S. Appl. No. 16/944,706 Office Action dated Apr. 1, 2021.
U.S. Appl. No. 15/781,978 Office Action dated Feb. 13, 2020.
U.S. Appl. No. 15/781,978 Office Action dated Sep. 24, 2019.
Zhu, et al. Anisotropic, Transparent Films with Aligned Cellulose Nanofibers. Adv Mater. Jun. 2017;29(21).
Zhu, et al. Highly Anisotropic, Highly Transparent Wood Composites. Adv Mater. Jul. 2016;28(26):5181-7.
Zhu, L. et al; "Transparent and Hazewood Composites for Highly Efficient Broadband Light Management in Solar Cells", 2016. Nano Energy, 26, pp. 332-339.
Co-pending U.S. Appl. No. 18/168,920, inventors Thevenin; Raphaële et al., filed Feb. 14, 2023.
Engineering ToolBox, (2008). Refractive Index common Liquids, Solids and Gases. [online] Available at: https://www.engineeringtoolbox.com/refractive-index-d_1264.html.
Hexion. Hot topic: Evolving fire performance requirements can be met through the use of phenolic resins. Composite Materials. Railway Interiors International. Annual Showcase 2019. pp. 74-75. Retrieved online at https://www.hexion.com/docs/default-source/psr/evolving-fire-performance-requirements-can-be-met-through-the-use-of-phenolic-resins.pdf?sfvrsn=aae6b95e_4.
Mathews, et al. Bacterial biodegradation and bioconversion of industrial lignocellulosic streams. Appl Microbiol Biotechnol. Apr. 2015;99(7):2939-2954. doi: 10.1007/s00253-015-6471-y. Epub Feb. 27, 2015.
PCT/FR2021/051236 International Search Report with Written Opinion dated Sep. 24, 2021. (English Translation).
Roger M. Rowell, et al, Handbook of Wood Chemistry and Wood Composites, 2012.
The Dow Chemical Company. Ethanolamines: Monoethanolamine Diethanolamine Triethanolamine. Published Jan. 2003. 21 pages. Retrieved online at http://www.resikem.com.ar/images/dow-ethanolamines.pdf.
U.S. Appl. No. 15/781,978 Notice of Allowance dated Oct. 14, 2021.

U.S. Appl. No. 16/700,123 Office Action dated Aug. 23, 2022.
U.S. Appl. No. 16/700,123 Office Action dated Mar. 28, 2023.
U.S. Appl. No. 16/700,123 Office Action dated Oct. 5, 2021.
U.S. Appl. No. 16/944,706 Notice of Allowance dated Aug. 5, 2022.
U.S. Appl. No. 16/944,706 Notice of Allowance dated Jan. 31, 2023.
U.S. Appl. No. 16/944,706 Notice of Allowance dated Jun. 16, 2022.
U.S. Appl. No. 16/944,706 Notice of Allowance dated May 18, 2022.
U.S. Appl. No. 16/944,706 Notice of Allowance dated Sep. 7, 2022.
U.S. Appl. No. 16/944,706 Office Action dated Dec. 30, 2021.
U.S. Appl. No. 17/576,799 Office Action dated Apr. 28, 2023.
U.S. Appl. No. 17/576,799 Office Action dated Jun. 8, 2022.
U.S. Appl. No. 17/576,799 Office Action dated Sep. 21, 2022.
U.S. Appl. No. 17/824,222 Notice of Allowance dated Apr. 19, 2023.
U.S. Appl. No. 17/824,222 Notice of Allowance dated Dec. 29, 2022.
U.S. Appl. No. 17/824,222 Notice of Allowance dated Jan. 12, 2023.
U.S. Appl. No. 17/824,222 Notice of Allowance dated Jan. 27, 2023.
U.S. Appl. No. 17/824,222 Office Action dated Aug. 18, 2022.
U.S. Appl. No. 18/168,920 Office Action dated Apr. 4, 2024.
Co-pending U.S. Appl. No. 18/240,430, inventor Boitouzet; Timothée, filed Aug. 31, 2023.
PCT/FR2022/050356 International Search Report with Written Opinion dated Jun. 9, 2022.
U.S. Appl. No. 16/700,123 Notice of Allowance dated Jul. 20, 2023.
U.S. Appl. No. 17/576,799 Office Action dated Oct. 10, 2023.
Kuhns, et al. Wood Heating. Utah State University Forestry Extension. Available at https://forestry.usu.edu/forest-products/wood-heating . Accessed on Jul. 9, 2019.
The Shodor Education Foundation, Inc. How to Weight a Tree. Available at https://shodor.org/succeedhi/succeedhi/weightree/percentWater-content.html . Accessed on Jul. 9, 2019.
U.S. Appl. No. 17/576,799 Office Action dated Sep. 16, 2024.
U.S. Appl. No. 18/168,920 Office Action dated Dec. 19, 2024.
U.S. Appl. No. 17/576,799 Office Action dated Apr. 2, 2025.
U.S. Appl. No. 18/240,430 Office Action dated May 20, 2025.

* cited by examiner

PART MADE FROM LIGNOCELLULOSIC MATERIAL AND METHOD FOR PRODUCING SUCH A PART

CROSS-REFERENCE

This application is a continuation of International Application Serial No. PCT/FR2019/052177, filed Sep. 18, 2019, which claims priority to French Patent Application No. 1858555, filed Sep. 20, 2018, which applications are incorporated herein by reference in their entirety for all purposes.

The present invention concerns a part made from lignocellulosic material, a process for manufacturing such a part and a process for transforming such a part made from lignocellulosic material.

The use of parts made of lignocellulosic material, and in particular of wood, is greatly valued for the natural aesthetics, the warm color and the specific feel of wood. It enables structures adorned with a wood cladding part to be ennobled.

Thus, wood cladding is currently much sought after for the furniture, the interior architecture, and the adornment of automotive vehicle interiors, or in the aeronautical or nautical field.

It has also been sought to use wood cladding of diverse forms, by for example creating curved surfaces by shaping a plate of wood. However, wood cladding is fragile and has tear or break lines when it is shaped and strongly curved.

A wood part is for example known, which is described in document US2008/0020222, formed from a wood plate, of thickness comprised between 0.1 and 1 mm, and impregnated with a resin in order for provide a certain flexibility for the wood plate. This plate of wood may thus be deformed to obtain a wood part of chosen three-dimensional shape.

Document US2008/0020222 describes in particular different embodiments in which several wood plates, impregnated with resin, are stacked and bonded to each other before being deformed through implementation of a hot pressing process. Two superposed wood plates, with their grain respective direction perpendicular to each other, may thus be deformed to constitute a loudspeaker member, with a central planar portion and a peripheral portion in the form of a flared frustoconical shape.

However, the superposition of wood plates to form a deformable wood part necessarily leads to obtaining parts of high thickness. The weight of such parts is thereby increased, and this may discourage their use in particular in the field of automotive or aeronautical interiors. Furthermore, particular care must be given on deforming wood plates superposed by hot pressing, in order to preserve the integrity of the part formed from wood plates that are stacked and bonded to each other. As the behavior of wood is not predictable when it is shaped, the rejection rate is very high, increasing the final cost of the deformable wood part.

The present invention is directed to providing a part made from lignocellulosic material and an associated manufacturing process that make it possible to obtain parts made of lignocellulosic material that mitigate the aforementioned drawbacks.

To that end, according to a first aspect, the present invention concerns a part made from lignocellulosic material, formed from a single sheet of lignocellulosic material that is partially delignified and impregnated with an impregnation polymer, said part comprising at least one curved portion having a surface of dual curvature.

The Applicant has observed that by preparing a part from a lignocellulosic material that is partly delignified and impregnated with a polymer, is was possible to produce a part having at least one portion of dual curvature from a single sheet.

In the partly delignified lignocellulosic material, the lignin (a chemical compound unevenly distributed between the cellulose fibers of the lignocellulosic material) is replaced by the impregnation polymer. The latter plays a reinforcing role, holding the cellulose fibers together and providing the cellulose fibers with uniform and even sheathing. When it is heated, the impregnation polymer is more flexible than the lignin it replaces, while having a sufficiently high Young's modulus to preserve sheathing and a mechanical link between the cellulose fibers.

The sheet of lignocellulosic material that is partially delignified and impregnated with a polymer is thus mechanically reinforced and can undergo greater bending, twisting, tension and compression deformations. It is thus possible to obtain very varied geometric shapes, which cannot be attained with sheets of untreated wood.

It is thus possible to obtain a part made from lignocellulosic material, formed from a single sheet and having a surface of dual curvature. The part may thus take on a three-dimensional shape that is very original for a part made from lignocellulosic material, for example, a hyperbolic paraboloid surface, a hemispherical shape, a shell shape, flared cone, tapered cylinder, and more generally any type of warped surface (non-developable surface).

Shaping with a single sheet makes it possible to obtain a very light part, without crossing being generated of lignocellulosic material fibers by superposition of wood plates in the prior art.

The part made from lignocellulosic material has improved mechanical properties, and in particular better resistance to shocks and rupture. It also has better toughness, that is to say a high resistance to breaking and low propensity for the propagation of cracks.

Such a part made from lignocellulosic material may be used without requiring mechanical reinforcements, such as a reinforcing layer of textile.

According to an advantageous embodiment, the part comprises at least one accessory overmolded onto said sheet, said at least one accessory being molded in an overmolding polymer configured to adhere to the impregnation polymer of said sheet.

The overmolding of an accessory makes it possible to provide diverse functions to the part made from lignocellulosic material, in order to obtain a directly usable finished part. The accessories may for example be fasteners, making it possible to fasten a part made from lignocellulosic material onto an external structure.

The overmolding of an accessory is made possible thanks to the chemical compatibility of the overmolding and impregnation polymers, enabling them to adhere to each other.

In a practical embodiment, the part made from lignocellulosic material comprises at least one translucent portion, the light transmission coefficient of said translucent portion being at least equal to 4%.

The part made from lignocellulosic material may thus be used as an interface for a display device or a control device, which backlighting for example.

Advantageously, said lignocellulosic material is wood comprising lignin and a network of cellulose and hemicellulose, said wood being delignified, the fraction of removed lignin being comprised between 40% and 90% by weight of the lignin present in said wood.

It is important for the lignocellulosic material to be partially delignified but not totally in order to keep the lignocellulosic material structure of the initial part.

By keeping the cellulosic and hemicellulosic structure of the lignocellulosic material, the part has a finish and a visual appearance close to that of wood. The feel of the part can remain close to that of untreated wood.

The fraction of removed lignin may be lower, and for example equal to 20% or even 10% by weight of the lignin present in the wood.

In practice, the sheet of lignocellulosic material that is at least partly delignified and impregnated with an impregnation polymer may comprise an impregnation polymer fraction comprised between 30% and 80% by mass relative to the total mass of said sheet.

Advantageously, the impregnation polymer is a thermoplastic resin, preferably a poly methyl methacrylate (PMMA).

In one embodiment, the thickness of said sheet is comprised between 0.1 and 3 mm.

The part made from lignocellulosic material is then well-adapted to form a cladding part.

In one embodiment, said curved portion has a curvature substantially identical in two orthogonal planes, of radius of curvature less than 80 mm, and preferably less than 40 mm. For example, said curved portion has a radius of curvature substantially equal to 20 mm.

In an alternative embodiment, said curved portion has a curvature in a first plane, of radius of curvature less than 10 mm, and preferably less than 8 mm.

In practice, when said curved portion has a curvature in a first plane of radius of curvature greater than or equal to 10 mm, the curvature in a second plane, orthogonal to said first plane may have a radius of curvature less than 4 mm, and preferably comprised between 1.5 and 2.5 mm.

The part made from lignocellulosic material may thus have very small radiuses of curvature in a portion of surface of dual curvature, that are unattainable with natural wood parts and independently of the directions of the fibers of the wood.

According to a second aspect, the invention concerns a process for manufacturing a part made from lignocellulosic material as described above, comprising the following steps:

- partially extracting the lignin from a plate of lignocellulosic material;
- filling said partly delignified plate with an impregnation compound;
- finishing by polymerization and/or cross-linking of said impregnation compound so as to produce a sheet of lignocellulosic material that is partly delignified and impregnated with an impregnation polymer; and
- shaping so as to obtain a part made from lignocellulosic material comprising at least one curved portion having a surface of dual curvature.

The manufacture of the part made from lignocellulosic material makes it possible to obtain diverse three-dimensional shapes from a single sheet of lignocellulosic material. Such a manufacturing process may be implemented with very diverse types of lignocellulosic materials or of wood, enabling the range of wood cladding parts to be enlarged.

It makes it possible to use kinds of wood that are more fragile but less expensive.

The process for manufacturing such a part made from lignocellulosic material requires a smaller number of operations, which leads to shorter production times. Furthermore, better control of the deformation of the partially delignified sheet of lignocellulosic material impregnated with an impregnation polymer makes it possible to reduce the proportion of waste and the cost of raw materials, and therefore the production cost.

In practice, the shaping step may be a thermoforming step.

In one embodiment, the shaping step is implemented on the sheet of lignocellulosic material that is partly delignified and impregnated with an impregnation polymer, after the finishing step.

The shaping step is thus implemented on a structured sheet, in which the impregnation compound has been polymerized. The lignocellulosic material thus has a composite material structure formed by a three-dimensional network of polymer incorporated in a network of cellulose and lignin. It is easy to manipulate for the implementation of the shaping step.

In one embodiment, the shaping step is implemented with a mold of which the molding surface is at least partly micro-structured or sand-blasted.

The surface of the part made from lignocellulosic material after shaping can thus be customized. The feel of the part can thus be chosen to be smooth, satin, or similar to wood.

In an advantageous embodiment, the manufacturing process further comprises a step of overmolding an accessory onto said sheet, said at least one accessory being molded in an overmolding polymer configured to adhere to the impregnation polymer of said sheet.

The overmolding step may thus be incorporated into the process for manufacturing the part made from lignocellulosic material, enabling the part made from lignocellulosic material to be accessorized for its future use. The improved overmolding step furthermore improves the dimensional stability of the part manufactured from the sheet made from lignocellulosic material.

The overmolding step makes it possible to provide functions for the part made from lignocellulosic material, which is difficult to achieve on a wood part without addition of reinforcing members.

According to a third aspect, the invention concerns a process for transforming a part made from lignocellulosic material as described above, the impregnation polymer being a thermoplastic polymer, comprising the following steps:

- heating said part; and
- thermoforming said heated part so as to obtain a transformed part comprising at least one curved portion.

Preferably, the transforming process comprises a step of flattening said heated part between said heating step and said thermoforming step.

The part made from lignocellulosic material can thus be recycled: by heating the part made from lignocellulosic material to a temperature greater than the vitreous transition temperature of the thermoplastic impregnation polymer, it is possible to thermoform that sheet in order to obtain a part of different shape. The life cycle of a part made from lignocellulosic material may thus be extended thanks to recycling possibilities.

By way of example, the part made from lignocellulosic material may be a man-machine interfere (MMI) of a display device or of a touch screen, a trimming structure of a cabin, in particular of an automotive vehicle, of an aircraft or of a nautical vehicle, or may form a casing structure, in particular cosmetic packaging.

Still other particularities and advantages of the invention will appear in the following description.

In the accompanying drawings, given by way of non-limiting example:

FIGS. 1A and 1B diagrammatically represent a part made from lignocellulosic material according to a first embodiment, in a front view and in cross-section;

FIGS. 2A and 2B diagrammatically illustrate a part made from lignocellulosic material according to a second embodiment, in a view from below and in cross-section;

Figure 1A:
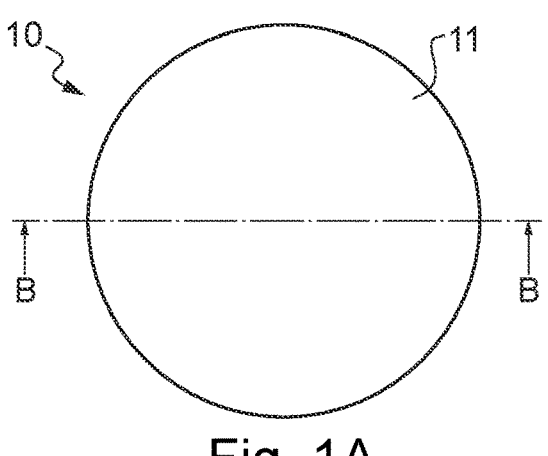
Figure 1B:
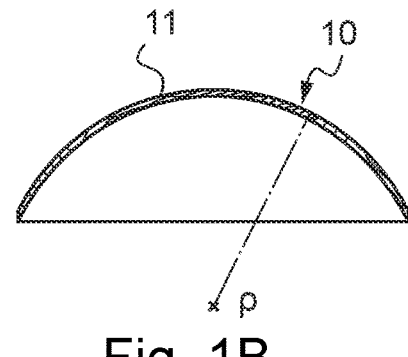

A description will first of all be made with reference to FIGS. 1A and 1B of a first embodiment of a part made from lignocellulosic material.

The part made from lignocellulosic material 10 is formed from a single sheet 11 of lignocellulosic material that is partly delignified and impregnated with an impregnation polymer.

As indicated below, the lignocellulosic material is only partially (and not totally) delignified.

The lignocellulosic material is preferably wood of any type, for example oak, walnut, poplar, ash, maple or sapele.

The lignocellulosic material is for example a wood cut and preferably a longitudinal cut (longitudinal radial cut (LRC) or tangential longitudinal cut TLC) or a transverse cut (TC).

The wood, comprising lignin and a network of cellulose and hemicellulose, is partially delignified.

According to the wood type used, the fraction of lignin removed may be higher or lower.

By way of non-limiting example, the fraction of removed lignin is comprised between 40% and 90% by weight of the lignin present in the original wood.

This fraction of removed lignin may be lower, and for example be substantially equal to 20% or 10% by weight of the lignin present in the wood.

The lignin is responsible for the rigidity of the original wood.

Partial delignification of the wood makes it possible to preserve its initial structure while making it slightly more flexible.

Analyses by spectroscopy or by microscope make it possible to observe the structure of the lignin, which is modified to a greater or lesser extent after delignification, in contrast to the cellulose and the hemicellulose which remain intact.

The lignocellulosic material is impregnated with an impregnation polymer, configured to fill the interstices present in the network of cellulose and hemicellulose and also to fill the spaces freed by the removed lignin. The impregnation polymer thus penetrates into the heart of the structure of the lignocellulosic material in order to mechanically reinforce and sheath the cellulose fibers of the wood.

The impregnation polymer may be a mixture of polymers or a mixture of polymer(s) and monomer(s), which may be thermoplastic or thermosetting.

By virtue of the at least partial delignification of the lignocellulosic material, the sheet can comprise an impregnation polymer fraction comprised between 30% and 80% by mass relative to the total mass of the sheet.

Of course, the values stated above for the fraction of removed lignin and the fraction of impregnation polymer are given by way of non-limiting examples.

The extent of delignification and/or the impregnation polymer used may be selected to obtain a part made from lignocellulosic material comprising at least one translucent part.

A translucent part, allowing light to pass through, has a light transmission coefficient at least equal to 4%.

The thickness of the sheet 11 forming the part made from lignocellulosic material 10 is comprised between 0.1 and 3 mm.

Preferably, this thickness can be comprised between 0.1 and 2 mm, or for instance between 0.4 and 1.3 mm.

The thickness of the sheet of lignocellulosic material 11 may be equal to 0.6 or 0.9 in particular embodiments of a part made from lignocellulosic material.

The sheet 11 here forms by itself the part made from lignocellulosic material 10, which has a smaller thickness which limits its weight. The sheet of lignocellulosic material 11 can thus form a cladding part configured to serve as trimming or to coat a mounting structure.

The part made from lignocellulosic material 10 as illustrated in FIGS. 1A and 1B comprises a curved portion having a surface of dual curvature.

In this embodiment, the entirety of the part has a shape of dual curvature. Of course, it could be possible for just the portion of the part made from lignocellulosic material to have such a shape of dual curvature.

In the embodiment of FIGS. 1A and 1B, the curved portion has a curvature $\rho$ that is substantially identical in two planes at a right angle.

The shape of the part made from lignocellulosic material 10 is thus a portion of a sphere of radius $\rho$.

The radius of curvature $\rho$ is at least less than 80 mm, and preferably less than 40 mm.

According to desired embodiments, the radius of curvature $\rho$ may be equal to 20 mm in both the planes at a right angle.

The part made from lignocellulosic material 10 so obtained, of small radius of curvature, can enable decors of wood to be produced of very domed hemispherical shape.

Figure 2A:
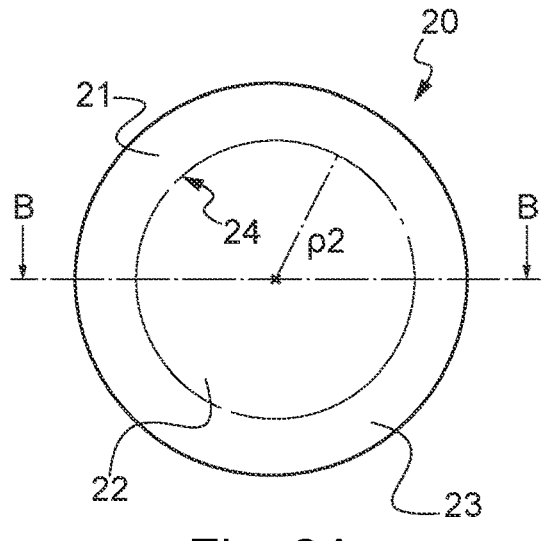
Figure 2B:
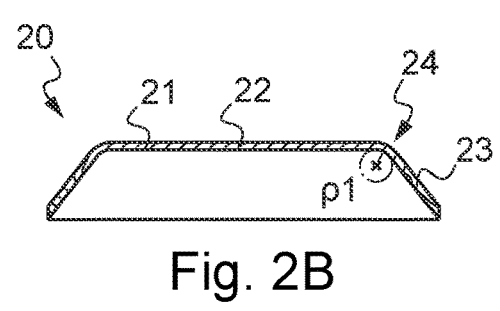

A second embodiment is illustrated in FIGS. 2A and 2B

The part made from lignocellulosic material 20 is formed from a single sheet 21 similar to that described above with reference to the first embodiment of the invention.

In this second embodiment, the part made from lignocellulosic material 20 has a curved portion 24 having a surface of dual curvature of different radius of curvature in the two planes at a right angle.

By way of non-limiting example, the part made from lignocellulosic material 20 illustrated in FIGS. 2A and 2B is a casing, of circular shape on one plane (corresponding to the view from below illustrated in FIG. 2A).

The part 20 thus comprises a substantially flat bottom 22 and a peripheral edge 23 flaring from the bottom 22.

The curved portion 24, corresponding to the connecting zone between the flat bottom 22 and the peripheral edge 23, thus has a surface of dual curvature in two planes at a right angle.

In particular, when the curvature in one of the planes is not too pronounced, the curvature in the other plane, at a right angle to it, can have a small radius of curvature, for example less than 10 mm, and preferably less than 8 mm.

By way of example, when the radius of curvature of the curved portion is greater than or equal to 10 mm in a first plane, the radius of curvature in a second plane, which is at a right angle to the first plane, can be less than 4 mm, and for example comprised between 1.5 and 2.5 mm.

By way of indication, in the embodiment illustrated in FIGS. 2A and 2B, the curved portion 24 has a first radius of curvature $\rho_1$ of the order of 4 mm, in a transverse plane of the part 20, and a second radius of curvature $\rho_2$ of the order of 7.5 cm, in a plane at a right angle, parallel to the plane formed by the flat bottom 22 of the part 20.

Figure 3A:
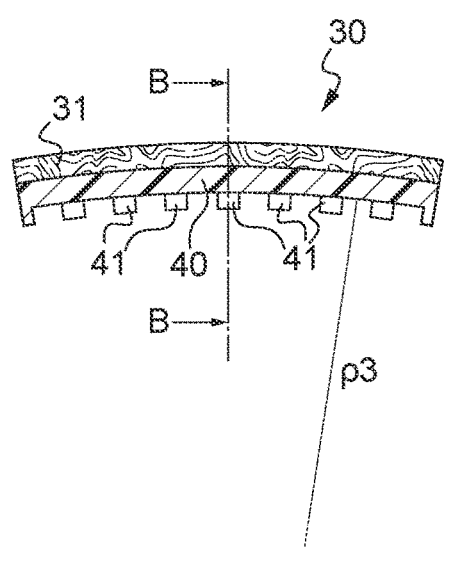
FIGS. 3A and 3B illustrate in cross-section a part made from lignocellulosic material according to a third embodiment.
Figure 3B:
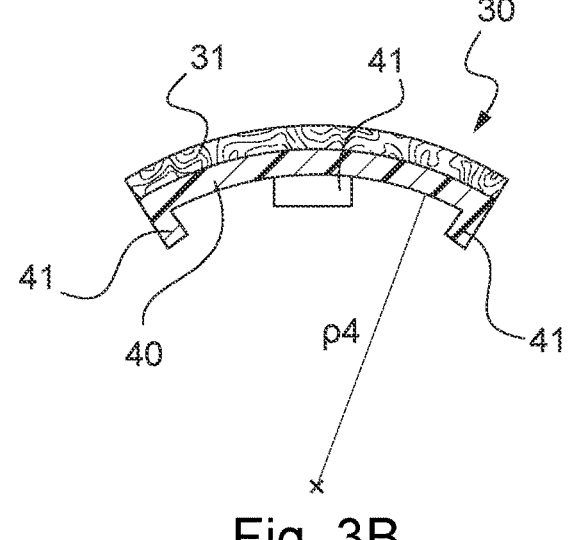

A third embodiment of a part made from lignocellulosic material is illustrated in FIGS. 3A and 3B.

The part made from lignocellulosic material 30 is formed from a single sheet 31, similar to that described above with reference to the first embodiment of the invention.

In this embodiment, the part made from lignocellulosic material 30 is formed from a curved portion having a surface of dual curvature in a longitudinal plane (FIG. 3A) and in a transverse plane (FIG. 3B).

The radiuses of curvature $\rho_3$, $\rho_4$ in the two planes at a right angle (longitudinal plane and transverse plane of the part 30) are identical, similar, or different.

In this third embodiment, the part made from lignocellulosic material 30 comprises at least one accessory 40 overmolded onto the sheet 31.

In this embodiment, and non-limitingly, the accessory 40 forms a layer overmolded onto a concave inside face of the sheet 31 of the part made from lignocellulosic material 30. The overmolded sheet 40 further comprises a series of lugs 41 forming projections or clips to enable the securing of the part made from lignocellulosic material to a mounting (not illustrated).

The accessory 40 is overmolded in an overmolding polymer configured to adhere to the impregnation polymer of the sheet 31 of the part made from lignocellulosic material 30.

By way of non-limiting example, the impregnation polymer can be a thermoplastic polymer such as a poly methyl methacrylate (PMMA), the molding polymer also being a poly methyl methacrylate.

More generally, the impregnation polymer and the overmolding polymer can be identical or different from each other.

The overmolding of such an accessory makes it possible to functionalize the part made from lignocellulosic material 30 and to associate with it various securing means (clips, plastic studs, nipples) when the part made from lignocellulosic material is provided to be fastened onto a mounting.

Such a part made from lignocellulosic material could be added on like a cladding part onto a mounting, for example to equip the interior of an automotive vehicle. Such a cladding part could, by way of non-limiting example, be used as a dashboard of an automotive, nautical or aeronautical vehicle, be used as central console of a automotive vehicle, or as trimming for the doors of a vehicle.

In particular, when the part made from lignocellulosic material comprises at least one translucent part as indicated above, it can be used as man-machine interfere (MMI) of a display device or of a touch screen, which may possibly be back-lit. The translucent part can also correspond to one or more touch control zones. For example, when the at least partly translucent part made from lignocellulosic material adorns a door, it can comprise touch controls for the opening and the closing of the windows of the vehicle.

In other embodiments, the accessories may be a plastic contour or a closure clip, for example when the part made from lignocellulosic material is provided to form the structure of a casing.

Thus, by way of non-limiting example, the part made from lignocellulosic material 20 illustrated in FIGS. 2A and

2B could constitute a casing bottom and the part made from lignocellulosic material 10 illustrated in FIGS. 1A and 1B a casing cover.

The production of such a casing and the holding in position of the cover on the bottom of the casing could be obtained by virtue of the overmolding on the periphery of the parts of lignocellulosic material 10, 20 of a complementary plastic contour and of a closure clip (not shown).

It is also possible to overmold just a joint-forming or hinge system on one side of the casing and a closure system on an opposite side of the casing.

Such a casing could for example be used in a field of cosmetics, jewelry, spectacles, etc.

The overmolded accessory can be present on only part of the part made from lignocellulosic material. However, the addition of an overmolding polymer layer on the part made from lignocellulosic material makes it possible to reinforce it mechanically and improve its dimensional stability.

More generally, the accessorization or functionalization of the part made from lignocellulosic material may be achieved otherwise than by overmolding of an accessory: the accessory may also be bonded to the sheet of partially delignified lignocellulosic material impregnated with an impregnation polymer.

The accessory may also be produced by extrusion.

A description will now be made with reference to FIG. 4 of an embodiment of a process for manufacturing a part made from lignocellulosic material as described above.

The process for manufacturing a part made from lignocellulosic material can comprise in advance a step S1 of cutting a plate of lignocellulosic material.

As indicated previously, this plate of lignocellulosic material can be obtained from a longitudinal or transverse cut of a piece of wood.

According to its principle, the manufacturing process next comprises a step S2 of partially extracting the lignin present in the plate of lignocellulosic material, a step S3 of filling the at least partially delignified plate with an impregnation compound and a step S4 of finishing by polymerization and/or cross-linking of the impregnation compound so as to produce a sheet of lignocellulosic material that is at least partially delignified and impregnated with an impregnation polymer.

Multiple examples of this process of delignification and impregnation are described in detail in document WO 2017098149, of which the content is incorporated by reference in the present description.

In particular, the step S2 of extracting the lignin can be implemented by soaking and washing, which may possibly be paired in a single step, of the plate of lignocellulosic material in a solution enabling partial dissolution of the lignin.

The fraction of removed lignin may be comprised between 40% and 90% by weight of the lignin present in the wood.

It may also be lower, and of the order of 20% or 10%.

The filling step S3 is a step during which an impregnation compound penetrates into the partially delignified structure of the plate of lignocellulosic material.

The impregnation compound may be a polymer or copolymer, preferably thermoplastic.

Alternatively, the filling compound may be a polymerizable monomer, the finishing step S4 then making it possible to obtain an impregnation polymer through polymerization.

The polymer is preferably thermoplastic here too, although a thermosetting polymer may be envisioned.

The impregnation component may also be a mixture of thermoplastic polymer and thermosetting polymer.

It may also be a monomer and polymer mixture or only comprise monomers.

The impregnation component may be petro-sourced or bio-sourced.

By way of non-limiting example, the impregnation compound introduced at the impregnation step S3 may be a methyl methacrylate (MMA) making it possible at the finishing step S4 to obtain a poly methyl methacrylate (PMMA) by polymerization.

The finishing step S4 thus makes it possible to produce, after polymerization and or cross-linking of the impregnation compound, a sheet of lignocellulosic material that is at least partially delignified and impregnated with an impregnation polymer.

The sheet may have a thickness comprised between 0.1 and 3 mm, configured for example to form a cladding part.

By way of example, a part made from lignocellulosic material can be produced using a plate of lignocellulosic material having a thickness equal to 0.6 or 0.9 mm.

After impregnation with a thermoplastic polymer such as PMMA and finishing, the sheet may have a thickness of the order of 0.95 mm (+ or −0.05 mm), by adding a larger or smaller amount of PMMA onto the plate of lignocellulosic material.

The process for manufacturing the part made from lignocellulosic material further comprises a shaping step S5.

By way of example embodiment, the forming step S5 can implement thermoforming of the part under conditions of heating.

The shaping of the part may also be carried out by hot shaping, thermocompression, stamping, embossing or any type of shaping, which may be hot and cold, with or without positive or negative pressure employed in the shaping step.

Figure 4:
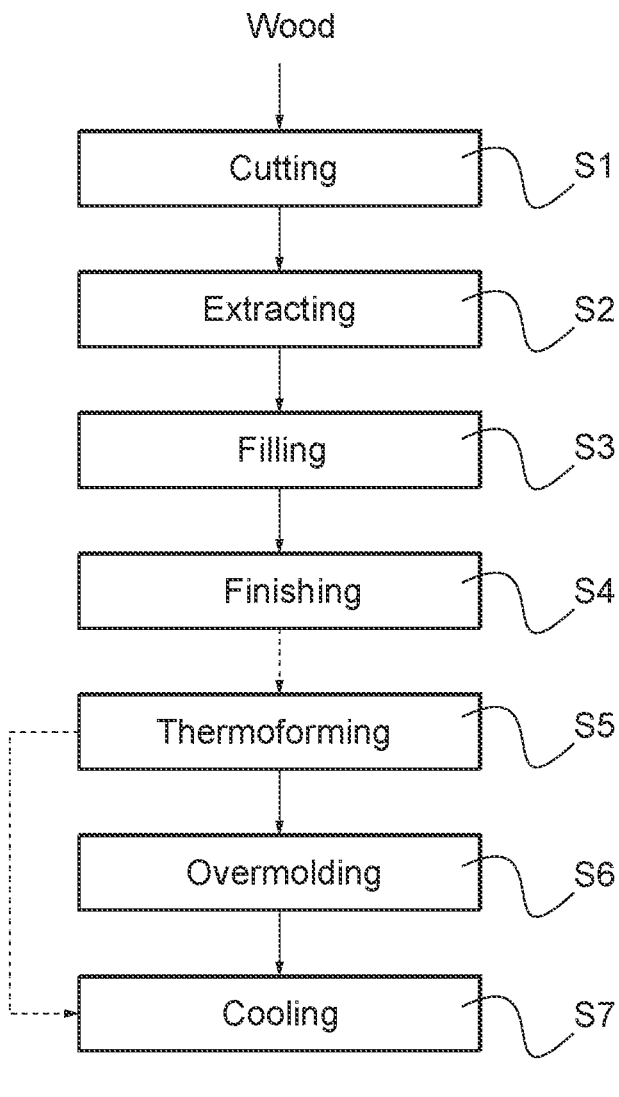
FIG. 4 is a block diagram illustrating the principle of a process for manufacturing a part made from lignocellulosic material according to one embodiment of the invention.

As symbolized in FIG. 4 by the arrow in dashed line between the finishing step S4 and the thermoforming step S5, these two steps of the manufacturing process may be decorrelated, that is to say implemented in a way that is dissociated in time and space.

In such an embodiment, further to the finishing step S4, the sheet produced is cooled, preferably naturally, to ambient temperature, the impregnation polymer and the partially delignified lignocellulosic material thus forming a rigid structure in sheet form.

The thermoforming step S5 can thus be implemented several days, weeks or months after the production of the sheet of lignocellulosic material that is partially delignified and impregnated with an impregnation polymer.

The thermoforming step S5 is implemented in this embodiment on the sheet in order to obtain at least one curved portion having a surface of dual curvature.

However, the manufacturing process is not limited to the shaping of a curved portion having a surface of dual curvature.

The manufacturing process can also be implemented with a step of shaping the sheet so as to obtain a curved portion of single curvature, such as a conical or frusto-conical portion or for instance a cylindrical or semi-cylindrical portion.

The part may comprises a curved portion of single curvature, of very small radius of curvature. It is thus possible to attain a radius of the order of 1.5 mm when the curvature is produced in a direction parallel to the direction of the fibers of the lignocellulosic material, and of the order of 2 mm when the curvature is produced in a direction at a right angle to the direction of the fibers of the lignocellulosic material.

It is thus possible to obtain parts with a curved portion close to a right angle.

As indicated above, the shaping step may be implemented by different technologies, in particular by thermocompression, vacuum thermoforming, or embossing.

Without being limitative, the shaping may implement industrial processes used to produce composite parts, and in particular Resin Transfer Molding (RTM) or High Pressure Resin Transfer Molding (HP-RTM).

By way of example, in a embodiment of use of thermocompression, the shaping step implements a step of heating the sheet and a step of heating the thermocompression mold.

The temperatures employed for heating the sheet and the mold depend on the vitreous transition temperature of the impregnation polymer.

The heating temperatures of the sheet and of the thermoforming mold must therefore be sufficient to fluidify the impregnation polymer, and thereby enable the shaping of the sheet, while maintaining a degree of viscosity for that impregnation polymer in order to preserve the structure and the maintenance of the sheet of lignocellulosic material impregnated with that impregnation polymer during the thermoforming step S5.

By way of example, when the impregnation polymer is a PMMA, its vitreous transition temperature is of the order of 80° C.

The sheet may for example be heated to a temperature of the order of 150° C., for a time of approximately 30 s, and preferably less than 1 min.

The thermoforming mold may be a temperature-controlled mold, brought to a temperature of the order of 80° C.

The heated sheet is placed in the mold, then the sheet is pressed in the closed mold.

The thermoforming mold may furthermore be treated on the surface (sandblasted surface, micro textured, etc.) in order to obtain different surface finishes for the part made from lignocellulosic material.

Of course, other embodiments for the thermocompression can be envisioned.

Thus, it is possible to heat the sheet alone, the mold being neither heated nor temperature-controlled.

The mold could for example be of wood or of plastic material.

An overmolding step S6 can next be implemented in order to overmold an accessory onto the sheet.

However, as symbolized in FIG. 4 by an arrow in dashed line leaving the thermoforming step S5, the part made from lignocellulosic material may be manufactured without any accessory. In such a case, the thermoforming step S5 is directly followed by a cooling step S7.

Preferably, the cooling step S7 is carried out for a few minutes, the thermoformed sheet remaining in the thermoforming mold. The mold may be cooled by temperature control.

If need be, the thermoformed cooled sheet may be cut into a chosen shape.

Any type of cutting may be used, such as cutting while hot by a mechanical cutting tool, for example a die-cutter, or cutting while cold, for example by milling or laser.

A trimming or semi-structural piece is thus obtained which is slim and light.

The part made from lignocellulosic material may have curved portions with single or double curvature, without breakage or whitening of the fibers of the lignocellulosic material.

When an accessory is overmolded onto the sheet, the overmolding step S6 preferably employs an overmolding polymer configured to adhere to the impregnation polymer of the sheet.

Preferably, the overmolding polymer is identical to the impregnation polymer of the sheet.

In the example described above, the overmolding polymer is preferably a poly methyl methacrylate (PMMA).

The overmolding polymer must have a sufficiently low melting temperature not to burn the lignocellulosic material of the thermoformed sheet.

Furthermore, its shrinkage coefficient must remain compatible with that of the sheet of at least partially delignified lignocellulosic material impregnated with the impregnation polymer.

The overmolding polymer must preferably be used in injection molding.

At the overmolding step S6, the overmolding mold and the duct for injection of the overmolding polymer must be heated to a temperature compatible with the conditions for injection of the overmolding polymer.

Further to the overmolding step S6, a cooling step S7 is implemented as described above.

The overmolding step S6 thus makes it possible to overmold plastic accessories onto the part made from lignocellulosic material as described above.

It may possibly provide an increased thickness of overmolding polymer on the sheet of the part made from lignocellulosic material, in order to augment the mechanical properties of the part made from lignocellulosic material.

The overmolding may also be carried out solely on the contour peripheral edge of the sheet.

Figure 5:
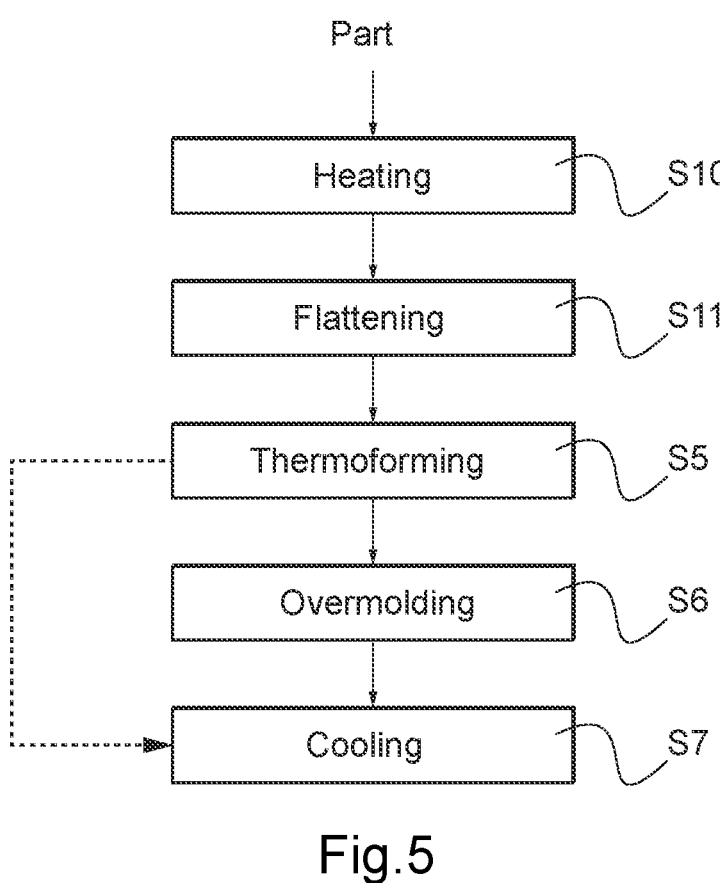
FIG. 5 is a block diagram illustrating the principle of a process for transforming a part made from lignocellulosic material according to one embodiment of the invention.

A description will now be made with reference to FIG. 5 of an embodiment of a process for transforming a part made from lignocellulosic material as described above.

This transforming process makes it possible to recycle a part made from lignocellulosic material by giving to it a new shape for a new use.

To that end, the impregnation polymer is a thermoplastic polymer, configured to be softened when the part is heated.

The transforming process thus comprises a step S10 of heating the part made from lignocellulosic material.

This heating step is carried out at a higher temperature than the vitreous transition temperature of the thermoplastic polymer that impregnates the part made from lignocellulosic material.

As indicated earlier, when the thermoplastic polymer is PMMA, of vitreous transition temperature of the order of 80° C., the part may be heated to a temperature of the order of 150° C.

Preferably a step S11 of flattening the heated part is implemented in order to eliminate all the curved portions of the part made from lignocellulosic material that it is desired to transform.

Starting with this heated and flattened part, a thermoforming step S5 is carried out.

This thermoforming step S5 is similar to that described above with reference to FIG. 4 and may be followed by an overmolding step S6 and by a cooling step S7 in order to obtain a transformed part comprising at least one curved portion.

This curved portion may be of single or dual curvature as described above.

This transforming process thus makes it possible to recycle the parts from lignocellulosic material.

Of course, the invention is not limited to the example embodiments described above.

As indicated above already, the examples in relation to dimensions and materials implemented are in no way limiting for the production of a part made from lignocellulosic material according to the invention.

Furthermore, the manufacturing process can also simultaneously implement the steps of finishing S4 and of thermoforming S5, which are applied to a plate of lignocellulosic material that is at least partly delignified and impregnated with an impregnation compound.

The pairing of these two steps makes it possible to obtain at the same time the polymerization and/or cross-linking of the impregnation compound and the curvature of the plate of lignocellulosic material so as to produce a sheet of lignocellulosic material that is partially delignified and impregnated with an impregnation polymer comprising at least one curved portion.

The invention claimed is:

1. A composite material comprising a lignocellulosic material, wherein said lignocellulosic material is wood that is partially delignified, wherein said lignocellulosic material comprises a surface,
wherein at least a portion of said surface is curved, wherein at least a portion of said curved surface is a dual curvature surface, and
wherein said lignocellulosic material further comprises at least one filling compound.

2. The composite material of claim 1, wherein said lignocellulosic material further comprises at least one accessory, wherein said at least one accessory is overmolded onto said lignocellulosic material using an overmolding polymer, and wherein said overmolding polymer is configured to adhere to at least a portion of said at least one filling compound.

3. The composite material of claim 1, wherein said lignocellulosic material comprises at least one translucent portion, and wherein said at least one translucent portion has a light transmission coefficient of at least equal to 4%.

4. The composite material of claim 1, wherein said lignocellulosic material comprises lignin, cellulose, and hemicellulose, wherein said lignin is between 10% to 60% by weight of said lignocellulosic material.

5. The composite material of claim 1, wherein said at least one filling compound is from about 30% to about 80% by mass of a total mass of said lignocellulosic material.

6. The composite material of claim 1, wherein said at least one filling compound comprise a thermoplastic polymer.

7. The composite material of claim 1, wherein said lignocellulosic material has a thickness from about 0.1 mm to about 3 mm.

8. The composite material of claim 1, wherein said curved portion has a curvature substantially identical in two orthogonal planes, with a radius of curvature less than 80 mm.

9. The composite material of claim 8, wherein said curved portion has said radius of curvature substantially equal to 20 mm.

10. The composite material of claim 8, wherein said curved portion has said curvature in a first plane, with said radius of curvature less than 10 mm.

11. The composite material of claim 8, wherein said curved portion has said curvature in a first plane with said radius of curvature greater than or equal to 10 mm, and a curvature in a second plane, orthogonal to said first plane, with a radius of curvature less than 4 mm.

12. The composite material of claim 1, wherein said at least one filling compound comprises an impregnation polymer.

13. The composite material of claim 12, further comprising at least one accessory overmolded onto said surface.

14. The composite material of claim 13, wherein said at least one accessory is molded in an overmolding polymer configured to adhere to said impregnation polymer.

15. The composite material of claim 14, wherein said impregnation polymer is configured to hold cellulose fibers together in said lignocellulosic material and to provide the said cellulose fibers with a uniform and even sheathing.

16. The composite material of claim 14, wherein said impregnation polymer is more flexible than lignin.

17. The composite material of claim 14, wherein said impregnation polymer has a higher elastic modulus than lignin.

18. The composite material of claim 1, wherein said wood is delignified to an extent of 40 to 90% by weight of lignin originally present in said wood.

19. The composite material of claim 1, wherein said dual curvature surface is independent of a direction of fibers of said lignocellulosic material.

20. The composite material of claim 1, wherein said composite material is configured to undergo greater bending, twisting, tension, and compressive deformation as compared to lignocellulosic material that is not partially delingified.

\*   \*   \*   \*   \*